(12) United States Patent
Chiang et al.

(10) Patent No.: US 10,492,243 B2
(45) Date of Patent: Nov. 26, 2019

(54) FALLBACK INDICATORS IN SESSION INITIATION PROTOCOL (SIP) SIGNALING

(71) Applicant: T-Mobile USA, Inc., Bellevue, WA (US)

(72) Inventors: Hsin-Fu Henry Chiang, Bellevue, WA (US); Jun Liu, Issaquah, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/913,665

(22) Filed: Mar. 6, 2018

(65) Prior Publication Data
US 2019/0281647 A1 Sep. 12, 2019

(51) Int. Cl.
*H04W 76/18* (2018.01)
*H04W 76/16* (2018.01)
(Continued)

(52) U.S. Cl.
CPC ......... *H04W 76/18* (2018.02); *H04L 65/1006* (2013.01); *H04L 65/1016* (2013.01);
(Continued)

(58) Field of Classification Search
CPC . H04W 36/00; H04W 36/03; H04W 36/0005; H04W 36/0007; H04W 36/0011; H04W 36/0016; H04W 36/0022; H04W 36/005; H04W 36/0055; H04W 36/0066; H04W 36/0079; H04W 36/04; H04W 36/06; H04W 36/08; H04W 36/10; H04W 36/12; H04W 36/125; H04W 36/14; H04W 36/16; H04W 36/165; H04W 36/18; H04W 36/24; H04W 36/26; H04W 36/305; H04W 36/34; H04W 36/38; H04W 40/00; H04W 40/02; H04W 40/24; H04W 48/00;
(Continued)

(56) References Cited

U.S. PATENT DOCUMENTS

2010/0329244 A1   12/2010   Buckley et al.
2013/0017805 A1*   1/2013   Andre-Jonsson ............
                                                H04W 36/0066
                                                455/411
(Continued)

OTHER PUBLICATIONS

The PCT Search Report and Written Opinion dated Jun. 12, 2019 for PCT Application No. PCT/US2019/018749, 11 pages.

*Primary Examiner* — Ashley Shivers
(74) *Attorney, Agent, or Firm* — Lee & Hayes, P.C.

(57) ABSTRACT

A user equipment (UE) and an Internet Protocol (IP) Multimedia Subsystem (IMS) node may exchange fallback indicators in SIP signaling for purposes of controlling fallback procedures implemented by the UE. By sending fallback indicators to an IMS node in a SIP request, a UE is able to inform the IMS node of its capabilities in regards to particular fallback radio access technologies (RATs) that are supported by the UE. The IMS node may respond to the UE with a SIP response that includes information indicating which of the supported Fallback RATs the UE is authorized to use (if any), and which of the supported Fallback RATs the UE is not authorized to use (if any). In this way, the IMS node can control a fallback procedure at the UE by indicating which Fallback RATs are usable by the UE to reattempt communication sessions that cannot be established on an existing RAT.

26 Claims, 9 Drawing Sheets

(51) Int. Cl.
*H04W 36/30* (2009.01)
*H04L 29/06* (2006.01)
*H04W 88/06* (2009.01)

(52) U.S. Cl.
CPC ....... *H04L 65/1069* (2013.01); *H04W 36/305* (2018.08); *H04W 76/16* (2018.02); *H04W 88/06* (2013.01)

(58) Field of Classification Search
CPC ..... H04W 48/02; H04W 48/08; H04W 48/10; H04W 48/12; H04W 48/18; H04W 48/20; H04W 12/08; H04W 76/00; H04W 76/10; H04W 76/16; H04W 76/18; H04W 76/19; H04W 76/30; H04W 76/36; H04L 29/06197; H04L 61/2564; H04L 65/1006; H04L 65/1016
See application file for complete search history.

(56) References Cited

U.S. PATENT DOCUMENTS

| | | |
|---|---|---|
| 2015/0245388 A1 | 8/2015 | Yerrabommanahalli |
| 2016/0021579 A1 | 1/2016 | Mufti |
| 2016/0135089 A1 | 5/2016 | Catovic et al. |
| 2016/0262006 A1* | 9/2016 | Keller .................... H04W 8/10 |
| 2017/0332300 A1 | 11/2017 | Choi et al. |

* cited by examiner

US 10,492,243 B2

FALLBACK INDICATORS IN SESSION INITIATION PROTOCOL (SIP) SIGNALING

BACKGROUND

Cellular networks are constantly evolving. For example, fifth generation (5G) networks are evolving from fourth generation (4G) Long Term Evolution (LTE) networks, which, in turn, evolved from third generation (3G), and second generation (2G) networks. Because the evolution of these technologies takes time, today's cellular networks are "heterogeneous" by employing a mixture of newer (e.g., 5G) and legacy (e.g., 4G/3G/2G) radio access technology (RAT) systems. This heterogeneous quality of cellular networks is likely to exist in future cellular networks as well. Even though a user equipment (UE) may employ the latest cellular radio technology, the UE often continues to support legacy RAT systems for various reasons.

Upon 5G's official deployment, 5G-compliant UEs will prefer to use a 5G RAT system and core network to establish communication sessions. This is because 5G technology promises to offer relatively high capacity, reliability, and data throughput as compared to the available legacy RATs. In most UEs, a choice of which RAT system to employ depends primarily on which RATs are available to the UE at its present geographic location. Nevertheless, when a 5G RAT is available, and a communication session (e.g., a voice call) is established using a 5G RAT, it is still possible for something to go wrong. For instance, an issue with the telecommunications network itself (e.g., the data core, the IP Multimedia Subsystem (IMS) core, etc.) may render a 5G-compliant UE unable to establish a session using the 5G RAT.

In 5G, however, fallback procedures are largely non-existent due to the fact that the 5G core network is not backwards compatible with existing 4G technology. Moreover, Circuit Switched Fallback (CSFB) procedures are not supported by the 5G network. If a traditional fallback approach is adopted for 5G-compliant UEs—say one that is similar to the approach in CSFB—one might expect such a programmed UE to always retry a failed 5G communication session using an available legacy RAT(s), if one is available. In this approach, if repeated fallback attempts are unsuccessful, computing resources (e.g., processing resources, power resources, network bandwidth resources, etc.) may be wasted trying, but failing, to reattempt a communication session on a legacy RAT. The impact of this approach can be severe, especially considering the vast number of UEs that may be simultaneously retrying to establish respective 5G communication sessions that failed (e.g., when a widespread outage occurs). In addition to the unneeded resource consumption on the UE, this can place significant stress on a cellular network, especially when capacity for legacy sessions dwindles in the future due to an anticipated reduction in paid licenses, for example.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1A:
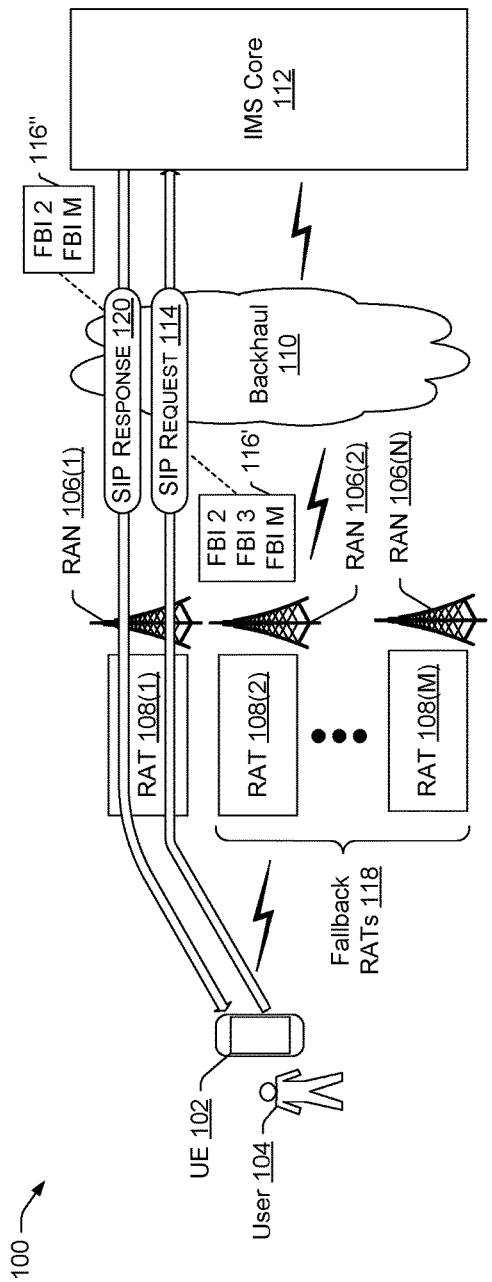
FIG. 1A is a diagram showing an example environment for implementing fallback indicators in Session Initiation Protocol (SIP) signaling.

Described herein are, among other things, techniques for a UE and an IMS node to exchange fallback indicators in SIP signaling for purposes of controlling fallback procedures implemented by the UE. By sending fallback indicators to an IMS node in a SIP request, a UE is able to inform the IMS node of its capabilities in regards to particular Fallback radio access technologies (RATs) that are supported by the UE. The IMS node may respond to the UE with a SIP response that includes information indicating which of the supported Fallback RATs the UE is authorized to use (if any), and which of the supported Fallback RATs the UE is not authorized to use (if any). In this way, the IMS node can control a fallback procedure at the UE by indicating which Fallback RATs are usable by the UE to reattempt communication sessions that cannot be established on an existing RAT.

In some implementations, the techniques and systems described herein can be implemented with a 5G network and a 5G-compliant UE. However, the techniques and systems are not limited to implementations with a 5G network, and a person having ordinary skill in the art can readily recognize that any current or future radio technology may benefit from the fallback control techniques and systems described herein. Accordingly, examples presented herein often refer to a voice-based communication session that utilizes a preferred RAT as a "voice over new radio (VoNR)" session/call, which is meant to cover 5G voice sessions/calls, as well as other current and/or future sessions/calls that use a different radio technology than 5G, yet one that can benefit from the techniques and systems described herein. That said, a VoNR session/call, as used herein, can be distinguished from a voice over LTE (VoLTE) call that uses a 4G RAT, and/or a voice over WiFi (VoWiFi) call that uses a wireless access point (AP) to establish a call. These and similar predecessor RATs can be considered, and are referred to herein as, "legacy RATs" or "Fallback RATs."

In some examples, an exchange of fallback indicators in SIP signaling may involve a UE informing an IMS node that the UE is capable of reattempting communication sessions using one or more Fallback RATs in the event that a particular RAT (which is available to, and preferred by, the UE) is no longer usable to establish a communication session. In an example, a 5G-compliant UE may inform an IMS node that the UE is capable of using a 4G LTE RAT, and/or a WiFi AP, and/or additional types of RATs, to reattempt a communication session. The UE can inform the IMS node of these capabilities by sending a SIP request to the IMS node over a telecommunications network, wherein the SIP request includes one or more fallback indicators corresponding to the Fallback RATs supported by the UE.

In response, the IMS node may indicate that it authorizes some, all, or none, of the Fallback RATs supported by the UE. To do this, the IMS node may send a SIP response that includes information indicating, for each UE-supported Fallback RAT, that the UE is either authorized, or not authorized, to reattempt communication sessions using that Fallback RAT. Thereafter, in the event that a communication session for the UE cannot be established using a particular RAT chosen for establishing the communication session, the UE is able to fallback to a Fallback RAT authorized by the IMS node in the SIP response.

In this manner, the techniques and systems disclosed herein can be thought of as a "network-controlled" fallback approach because the IMS node is the entity that determines which Fallback RATs the UE is authorized to use, if any, and the UE implements a fallback procedure that reattempts a failed attempt at establishing a communication session using a network-authorized Fallback RAT. Notably, the UE also refrains from trying to reattempt a failed attempt at establishing a communication session on a Fallback RAT that the network does not authorize the UE to use. This is notwithstanding the UE's support for an unauthorized Fallback RAT, which means that even though a UE may be configured to reattempt a communication session on a legacy RAT, the network may not authorize the UE to do so. This network-controlled fallback procedure can be implemented on a per-session (e.g., per-call) basis, meaning that the UE determines, for each communication session it attempts to establish, which Fallback RATs are authorized for use in the event of a communication session failure. Additionally, or alternatively, the network-controlled fallback procedure can be implemented prior to the setup of a communication session so that a UE can implement a common fallback procedure for multiple different communication sessions.

By exchanging fallback indicators in SIP signaling, one or more devices can be configured to conserve resources with respect to communications bandwidth resources, processing resources, memory resources, power resources, and/or other resources. For instance, if the network knows—before a call is even established—that fallback attempts using a particular Fallback RAT will be futile for a UE (e.g., when the UE is already using that RAT because a preferred RAT is unavailable, or when the network does not have capacity to handle fallback sessions from UEs on a particular Fallback RAT, etc.), the IMS node can inform the UE of this determination ahead of time in a SIP response so that the UE does not waste any time or resources trying to reattempt a communication session on the unauthorized Fallback RAT. This conserves processing resources, power resources, and network bandwidth resources on the UE because the UE does not waste processor cycles, and does not send network packets, in a futile reattempt(s) at establishing the communication session. On the network side, stopping UEs from falling back to particular RATs can provide the telecommunications network with more time when time matters most (e.g., when the network is trying to recover from a widespread outage). If the network is provided with ample time to recover from a widespread outage by suppressing fallback attempts from a large number of UEs, the network will recover quicker from an issue causing session failures using a preferred RAT system because it will not be stressed by a large number of UEs attempting to fallback during the outage. The techniques and systems described herein can also improve a user experience by resolving a failed communication session attempt quicker and avoiding long periods of silence for the end user while a UE might otherwise be trying, and failing, to fallback to a particular RAT. Additional technical effects can also be realized from an implementation of the technologies disclosed herein.

Also described herein are systems and devices comprising one or more processors and one or more memories, as well as non-transitory computer-readable media storing computer-executable instructions that, when executed, by one or more processors perform various acts and/or processes disclosed herein.

Figure 1B:
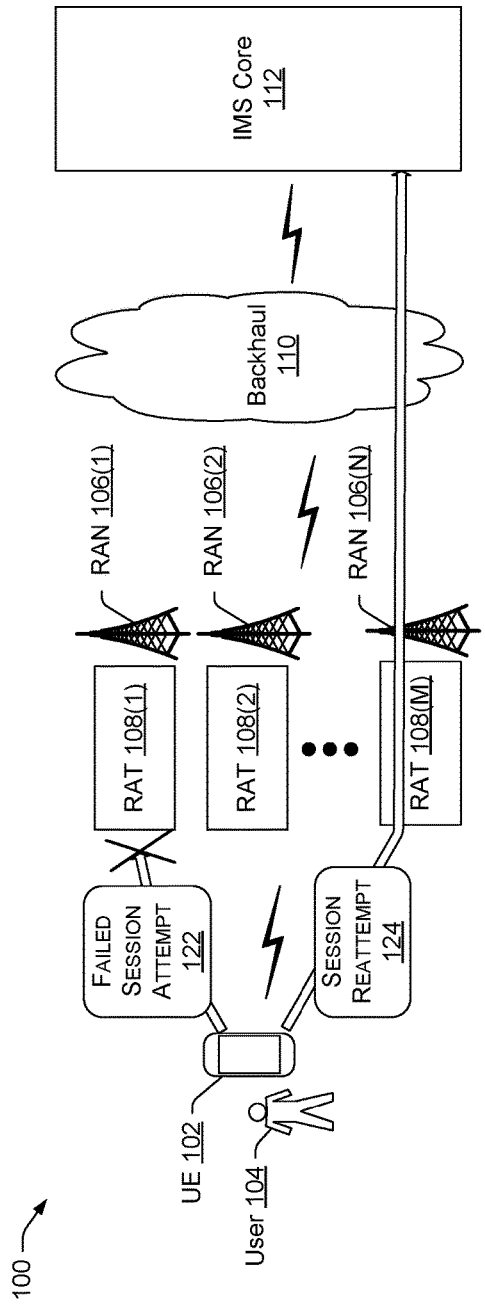
FIG. 1B is a diagram showing the example environment of FIG. 1A with a UE reattempting to establish a communication session using a network-authorized Fallback RAT.

FIGS. 1A and 1B are diagrams showing an example environment 100, at two different times, for implementing fallback indicators in SIP signaling. FIG. 1A illustrates the environment 100 at a time when a UE 102 may be performing a registration for IMS-based services, or a time when a user 104 of the UE 102 has initiated a communication session (e.g., dialed a number to call another user), and hence, the UE 102 may be trying to setup a communication session in FIG. 1A. Meanwhile, FIG. 1B illustrates the environment 100 at a time when the UE 102 is reattempting to establish a communication session (e.g., a voice call) after a session failure.

In accordance with various embodiments described herein, the terms "user equipment (UE)," "communication device," "device," "wireless communication device," "wireless device," "mobile device," "terminal," "wireless terminal," "mobile terminal," and "client device," be used interchangeably herein to describe any UE (e.g., the UE 102) that is capable of transmitting/receiving data, wirelessly and/or over wired networks, using any suitable communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), voice over New Radio (VoNR)—e.g., 5G, IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

Furthermore, although the UE 102 is shown as a mobile phone or handset in FIGS. 1A and 1B, the UE 102 may be implemented as any suitable type of communication device configured to communicate over a telecommunications network, including, without limitation, a mobile phone (e.g., a smart phone) or a handset, a tablet computer, a laptop computer, a portable digital assistant (PDA), a wearable computer (e.g., electronic/smart glasses, a smart watch, fitness trackers, etc.), an in-vehicle (e.g., in-car) computer, and/or any similar communication device. In addition, the UE 102 may be a mobile device, or the UE 102 may, alternatively, be a non-mobile (or situated) communication device including, without limitation, a television (smart television), a set-top-box (STB), a game console, a desktop computer, and the like.

In general, a user 104 can utilize the UE 102 to communicate with other users and devices via a telecommunications network. Such a telecommunications network may represent a network comprising a plurality of network nodes disposed between the UE 102 and another device or user terminal. In some cases, the telecommunications network may be inclusive of the other device(s) that is communicating with the UE 102, such as when the UE 102 communicates with an application server or a similar network node. It is to be appreciated that a telecommunications network over which the UE 102 communicates can include any suitable types, and numbers, of network nodes to enable the transmission of IP multimedia over the telecommunications network. FIGS. 1A and 1B show at least some suitable network nodes and systems that may constitute at least part of the telecommunications network. For example, the telecommunications network may include, without limitation, various radio access networks (RANs) 106(1)-(N) (e.g., eNodeB, cell towers, wireless access points (APs), etc.). Each RAN 106 may be associated with a corresponding RAT 108(1)-(M). The telecommunications network may further include, without limitation, a backhaul network 110, and a multimedia telephony (MMTel) and IP Multimedia Subsystem (IMS) architecture (sometimes referred to as the "IMS core" 112, the "IMS core network" 112, the "IMS network" 112, the "Core Network (CN)" 112, or the "IM CN Subsystem" 112). IMS is an architectural framework defined by the $3^{rd}$ Generation Partnership Project (3GPP) for delivering IP multimedia to UEs, such as the UE 102.

Various portions of the aforementioned telecommunications network can be maintained and/or operated by one or more service providers, such as one or more wireless carriers (sometimes referred to as "operators"), that provide IMS-based services to users (sometimes called "subscribers") who are associated with UEs (e.g., the UE 102) for accessing the IMS-based services to which they have subscribed. For example, a service provider may offer multimedia telephony services that allow a subscribed user 104 to call or message other users via the telecommunications network using his/her UE 102. A user 104 can also utilize an associated UE 102 to receive, provide, or otherwise interact with various different IMS-based services by accessing the IMS core 112. In this manner, a carrier may offer any type of IMS-based service(s), such as telephony services (or voice calling), emergency services (e.g., E911), gaming services, instant messaging services, presence services, video conferencing services, social networking and sharing services, location-based services, push-to-talk services, WiFi calling services, real time text (RTT) calling services, RTT video calling services, and so on. In order to access one or more of these services, the UE 102 is configured to request establishment of a communication session. Although many of the examples described herein relate to voice calling services, it is to be appreciated that the UE 102 may request establishment of any type of communication session.

Session Initiation Protocol (SIP) may be used for transmitting SIP messages before, during, or after a communication session (e.g., during the communication session in the signaling portion of the communication session, as opposed to the data or media stream portion of the communication session). Such SIP messages may include, without limitation, registration messages, session request messages, messages transmitted during the communication session, and the like, which are sent to the IMS core 112 of the telecommunications network, and received therefrom. SIP is a signaling protocol that can be used to establish, modify, and terminate communication sessions over packet networks, and to authenticate access to IMS-based services. As used herein, a "SIP request" is a message that is sent from a UE 102 to the IMS core 112 of the telecommunications network using SIP protocol, and a "SIP response" is a message that is sent from the IMS core 112 of the telecommunications network to a UE 102 using SIP protocol.

In FIG. 1A, the UE 102 is shown as sending a SIP request 114 to the IMS core 112 over the telecommunications network. The SIP request 114 may include one or more fallback indicators (FBIs) 116', which are used to inform a receiving IMS node of the UE's 102 capabilities in terms of the Fallback RATs 118 that the UE 102 supports. In an example, the first RAT 108(1) may represent a 5G RAT, and the UE 102 may be a 5G-compliant UE 102 that is configured to establish communication sessions using the 5G RAT 108(1). Meanwhile, the second RAT 108(2) may represent a 4G LTE RAT over which the UE 102 may be configured to establish a voice-based communication session as a VoLTE call. An intermediate RAT (say RAT 108(3), which is not shown in FIG. 1A) may represent a WiFi RAT over which the UE 102 may be configured to establish a voice-based communication session as a VoWiFi call. Lastly, the $M^{th}$ RAT 108(M) may represent a 3G or 2G RAT over which the UE 102 may establish a call over a circuit-switched network.

The UE 102 may prefer to use the first RAT 108(1), when available, because it may offer the latest technology that provides advantages over other available RATs 108(2)-(M). Meanwhile, the UE 102 may consider any individual predecessor (or legacy) RAT (e.g., RATs 108(2)-(M)) to be a Fallback RAT 118 that, if supported by the UE 102, is available to reattempt a failed communication session. The fallback indicators 116' that are included in the SIP request 114 may therefore correspond to the Fallback RATs 118, which, in the example of FIG. 1A, are supported by the UE 102. As shown in FIG. 1A, the SIP request 114 includes fallback indicator (FBI) 2, FBI 3, and FBI M. This may indicate to the receiving IMS node that the UE 102 is capable of using RAT 108(2) (corresponding to FBI 2), RAT 108(3) (corresponding to FBI 3), and RAT 108(M) (corresponding to FBI M) as Fallback RATs 118 in the event that there is an issue preventing a communication session from being established on the first RAT 108(1), which, again, may be a preferred RAT (e.g., a 5G RAT).

In some embodiments, the fallback indicators 116' included in the SIP request 114 may comprise feature tags, and these feature tags may be included in a header of the SIP request 114. For example, FBI 2 may be implemented as a "VoLTEFB" feature tag to indicate that the UE 102 is capable of reattempting communication sessions using a 4G RAT (e.g., VoLTE). Meanwhile, FBI 3 may be implemented as a "VoWiFiFB" feature tag to indicate that the UE 102 is also capable of reattempting communication sessions using a WiFi AP (e.g., WiFi calling). Lastly, FBI M may be implemented as a "CSFB" feature tag to indicate that the UE 102 is also capable of reattempting communication sessions using a 3G/2G RAT. These are merely examples of types of feature tags that can be used as fallback indicators 116' in the SIP request 114. Furthermore, in some embodiments, the fallback indicators 116' can be included elsewhere in the SIP request 114, such as in a Require header field of the SIP request 114, in a Supported header field of the SIP request 114, and the like.

It is to be appreciated that the timing of sending the SIP request 114 may vary. For instance, the SIP request 114 can be sent as a registration request (e.g., using the SIP REGISTER method) when the UE 102 is requesting registration for one or more IMS-based services. That is, before requesting establishment of a communication session, the UE 102 can request registration for one or more IMS-based services while the UE 102 is in idle mode, and the SIP request 114 may represent such a request that also includes the fallback indicators 116'.

Additionally, or alternatively, the SIP request 114 can be sent as a session request (e.g., using the SIP INVITE method) when the UE 102 is requesting to establish a communication session. That is, whenever the user 104 wants to establish a communication session (e.g., a voice call), the user 104 may provide user input to the UE 102 (e.g., by dialing a phone number of another user), which may result in the transmission of the SIP request 114 as a session request that includes the fallback indicators 116'. When the SIP request 114 is sent as a session request, fallback procedures can be determined for the UE 102 on a per-session (e.g., per-call) basis. By contrast, sending fallback indicators 116' during registration does not allow for determining fallback procedures on a per-session basis. Nevertheless, there may be reasons to send fallback indicators 116' at a time of registration. In some embodiments, the UE 102 may be configured to send fallback indicators 116' in both a registration request and a session request such that the SIP request 114 in FIG. 1A represents one or the other type of request. In this scenario, a SIP response 120 to a session request may override a previous SIP response to a registration request, or vice versa. Since a registration request is sent before a session request, a SIP response 120 to the session request may override an earlier-transmitted SIP response to an earlier-transmitted registration request, assuming there is an actual conflict between the SIP responses in terms of the Fallback RATs 118 that are authorized in each SIP response. If both SIP responses do not conflict with each other by virtue of the same set of Fallback RATs 118 being authorized in both SIP responses, then there may be no need to override one SIP response with the other.

In some embodiments, the SIP request 114 that includes the fallback indicator(s) 116' can be sent as a registration request (e.g., using the SIP REGISTER method), and this SIP request 114 can be followed by a subscription request (e.g., using the SIP SUBSCRIBE method) as part of a subscription registration event. For example, the UE 102 may send a SIP SUBSCRIBE request with the Event: 'reg' following a SIP REGISTER request that included the fallback indicator(s) 116'. In this scenario, an IMS node of the IMS core 112 may respond with a SIP response 120 that uses the SIP NOTIFY method, and includes information indicating which of the supported Fallback RATs 118 the UE 102 is authorized to use. For example, the SIP response 120 may be sent as a SIP NOTIFY response with the Event: 'reg', and including information, such as a set of authorized fallback indicators 116".

In any case, an IMS node of the IMS core 112 may receive the SIP request 114, may read or parse the fallback indicator(s) 116' included in the SIP request 114, and may respond by sending the SIP response 120. The SIP response 120 may include information indicating which of the supported Fallback RATs 118 the UE 102 is authorized to use. For example, the IMS node may authorize some, all, or none of the Fallback RATs 118 (corresponding to the fallback indicators 116') supported by the UE 102. In the example of FIG. 1A, the SIP response 120 is shown as including this information in the form of fallback indicators 116". Thus, the IMS node may be configured to indicate which Fallback RATs 118 are authorized by including the corresponding fallback indicators 116" for those authorized Fallback RATs 118 in the SIP response 120. In an implementation, the IMS node may be configured to omit a fallback indicator 116' from the SIP response 120 as a way of indicating that the corresponding Fallback RAT 118 is not authorized for use by the UE 102. For instance, any of the fallback indicators 116' in the SIP request 114 may be omitted from the set of fallback indicators 116" in the SIP response 120 to eliminate those Fallback RATs 118 that the UE 102 is not authorized to use. In the example of FIG. 1A, the SIP response 120 omits fallback indicator FBI 3 from the set of fallback indicators 116", where FBI 3 was included in the set of fallback indicators 116' in the SIP request 114. Accordingly, this omission can be interpreted by the UE 102 to mean that the network does not authorize the UE 102 to reattempt communication sessions using the RAT 108(3) (which corresponds to FBI 3) as a Fallback RAT 118. In an example, if the RAT 108(3) (not shown in FIG. 1A) represents a wireless AP that the UE 102 is configured to utilize for reattempting a voice-based communication session as a VoWiFi call, the IMS node may nevertheless indicate, by omitting the fallback indicator FBI 3 from the SIP response 120, that the UE 102 is not authorized to reattempt a failed 5G voice-based communication session as a VoWiFi call.

Although FIG. 1A illustrates that the IMS node can use an "inclusion/omission" technique to indicate which Fallback RATs 118 are authorized/not authorized, it is to be appreciated that the IMS node may utilize other techniques to respond with similar fallback information. For example, the SIP response 120—instead of omitting individual ones of the fallback indicators 116'—may include a set of fallback indicators 116" that is the same exact set of fallback indicators 116' included in the SIP request 114, along with corresponding answers (e.g., "yes" or "no", "authorized" or "not authorized", etc.) associated with each of the fallback indicators 116" in the SIP response 120. As with the SIP request 114, the fallback indicators 116" in the SIP response 120 may be implemented as feature tags, and the feature tags may be included in a header of the SIP response 120.

As will be described in more detail below, the IMS node may consider various criteria to determine which UE-supported Fallback RATs 118 to authorize, and which UE-supported Fallback RATs 118 not to authorize. In some embodiments, such as when the SIP request 114 represents a session request to establish a communication session, the criteria evaluated by the IMS node may cause the IMS node to respond differently to the same UE 102 on a per-session (e.g., per-call) basis. Example criteria will be described in more detail below with reference to the following figures.

Turning to FIG. 1B, the UE 102 is shown at a time when the UE 102 is reattempting to establish a communication session after a session failure during setup. In particular, after an initial attempt to establish a communication session using the RAT 108(1), which may be a preferred RAT (e.g., a 5G RAT), the UE 102 detects an issue that inhibits the communication session from being established using the RAT 108(1), which results in a failed communication session attempt 122. The issues causing the failed communication session attempt 122 can vary, and the UE 102 may receive a message from the network indicating the failure, and/or may try to send packets and fail to receive a response in a threshold amount of time, which may indicate to the UE 102 an inability to establish the communication session using the RAT 108(1). In an example, one or more network nodes supporting a 5G RAT system or the 5G core network may crash and redundancy mechanisms may fail, causing a widespread 5G outage. This is merely an example of an issue that can cause the failed communication session attempt 122, however, and other issues (e.g., coverage issues, etc.) may arise, which inhibit a communication session from being established over the RAT 108(1).

In response to the UE 102 determining that the communication session cannot be established using the RAT 108(1), the UE 102 may consult the information received earlier in SIP response 120 to determine which Fallback RATs 118 are authorized for reattempting to establish the failed communication session attempt 122 as a communication session reattempt 124. In the example of FIG. 1A, the SIP response 120 indicates (by the inclusion of FBI 2 and FBI M) that the RAT 108(2) and the RAT 108(M) are authorized for the UE 102 to reattempt the failed communication session 122 as a communication session reattempt 124. FIG. 1B shows that the UE 102 reattempts to establish the communication session using the RAT 108(M) based on the information included in the SIP response 120 (i.e., based on the inclusion of the FBI M) in the SIP response 120. When multiple Fallback RATs 118 are authorized in a SIP response 120 and are available to the UE 102 at a time when the communication session attempt using the RAT 108(1) fails, the UE 102 may implement a selection algorithm to select one of the multiple Fallback RATs 118 that are authorized for use in reattempting the communication session. In some embodiments, the UE 102 may use a selection algorithm that selects newer (more recent) RATs 108 over older (less recent) RATs 108, and/or the UE 102 may assess radio signal strength measurements to determine an optimal RAT 108, and so on. Notably, the UE 102, in response to the determining that the original communication session cannot be established using the RAT 108(1), may also refrain from trying to reattempt to establish the communication session using a RAT 108 that is not authorized in the SIP response 120. For example, the SIP response 120 in FIG. 1A omits FBI 3, and, based on this omission, the UE 102, in FIG. 1B, may refrain from trying to reattempt establishment of the communication session using the RAT 108(3) (corresponding to FBI 3), even in instances where the unauthorized RAT 108(3) is generally preferred by the UE 102 over individual ones of the authorized RATs 108. This conserves resources (e.g., UE resources and networking resources), as mentioned herein, by the UE 102 not wasting time and resources trying to fallback to RAT 108(3) when such an attempt may be futile (e.g., when the network does not have capacity to support UEs falling back to RAT 108(3), etc.).

Figure 2:
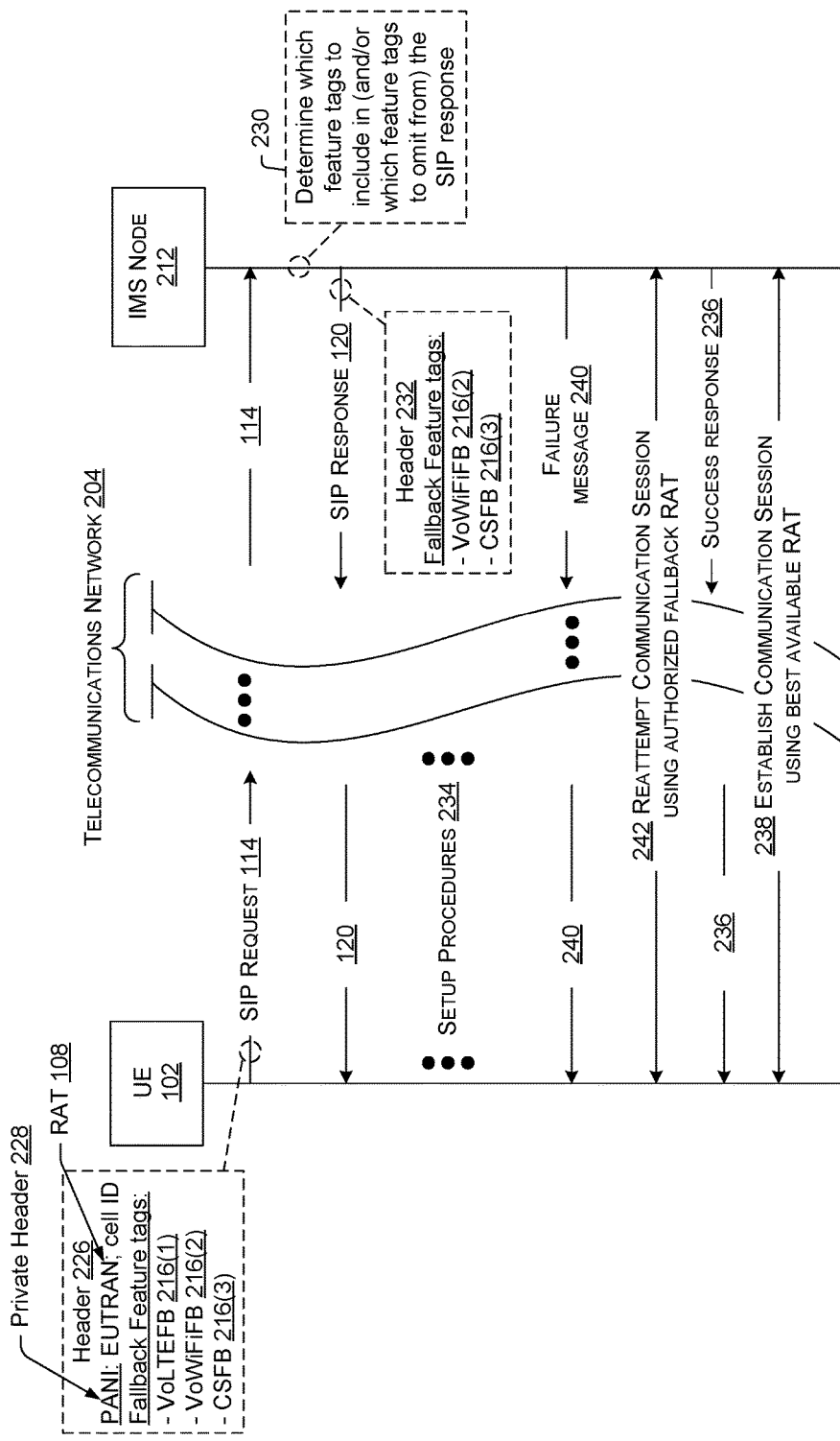
FIG. 2 is a diagram illustrating example signaling between a UE and an IMS node where fallback indicators are exchanged in SIP signaling.

FIG. 2 is a diagram illustrating example signaling between a UE 102 and an IMS node 212 where fallback indicators are exchanged in SIP signaling over a telecommunications network 204. As shown in FIG. 2, the UE 102 may send a SIP request 114 over the telecommunications network 204. The SIP request 114 may, in some embodiments, represent a registration request that uses the SIP REGISTER method to request registration for one or more IMS-based services (e.g., voice calling services). As such, the UE 102 may send the SIP request 114 in idle mode (e.g., when a user is carrying the UE 102 in his or her pocket and not currently engaged in a communication session). Additionally, or alternatively, the SIP request 114 may be sent as a session request that uses the SIP INVITE method to request establishment of the communication session. As an example, the UE 102 may, in response to receiving user input to request establishment of a communication session (e.g., a user 104 dialing a number, uttering a name of a contact, selecting a contact, etc.), attempt to establish a communication session by sending the SIP request 114 using the SIP INVITE method.

The SIP request 114 may include one or more fallback indicators (e.g., the fallback indicators 116' introduced in FIG. 1A). In FIG. 2, these fallback indicators are shown in the form of feature tags 216(1), 216(2), and 216(3). Although three feature tags 216(1)-(3) are included in the example SIP request 114 in FIG. 2, it is to be appreciated that any number of fallback indicators (e.g., feature tags 216) may be included in the SIP request 114, including a single feature tag 216 if the UE 102 supports a single Fallback RAT 118 and does not support any additional Fallback RATs 118. In any case, the SIP request 114 in FIG. 2 includes a first feature tag 216(1) (i.e., an example form of fallback indicator), a second feature tag 216(2), and a third feature tag 216(3), wherein each feature tag 216 is different from the others to indicate a specific Fallback RAT 118 that is supported by the UE 102. In this example, the UE 102 may be a 5G-compliant UE that supports a 4G LTE RAT 108 corresponding to the first feature tag 216(1) ("VoLTEFB" feature tag). The 5G-compliant UE 102 may also support a WiFi (or non-3GPP) RAT 108 corresponding to the second feature tag 216(2) ("VoWiFiFB" feature tag), as well as a circuit-switched RAT 108 corresponding to the third feature tag 216(3) ("CSFB" feature tag). The feature tags may be included in a header 226 of the SIP request 114.

The SIP request 114 may further include a private header 228 (e.g., a Private-Access-Network-Info (PANI) header) that specifies a particular RAT 108 that is available to the UE 102 for establishing a communication session, among other information that may be included in the private header 228. In this example, EUTRAN (which stands for "evolved universal terrestrial radio access network") may correspond to a 4G LTE RAT. In an example, the SIP request 114 may represent a session request (using the SIP INVITE method) to establish a communication session (e.g., a voice call) using a 4G LTE RAT, as indicated by the RAT 108 specified in the private header 228; in this case, "EUTRAN" is specified in the private header 228, which can be interpreted as a 4G LTE RAT, and the UE 102 is, therefore, attempting to establish a communication session using the 4G LTE RAT indicated in the private header 228 of the SIP request 114. This may be because a preferred RAT 108(1) is unavailable to the UE 102 at the time the SIP request 114 is sent, and the best available RAT 108 may be the RAT 108 specified in the private header 228.

Ultimately, the SIP request 114 can be received by the IMS node 212. The IMS node 212 may read or parse the feature tags 216(1)-(3) (feature tag being a form of fallback indicator), and, at 230, the IMS node 212 may determine which of the feature tags 216(1)-(3) to include in, and/or which of the feature tags 216(1)-(3) to omit from, a SIP response 120. As mentioned, the IMS node 212 may consider (or evaluate) various criteria to make the determination at 230. One example criterion that can be evaluated to make the determination at 230 is whether the SIP request 114 is a session request associated with an emergency short code (e.g., 911 in the United States) dialed by the user of the UE 102. In this scenario, if the SIP request 114 is a session request that is associated with an emergency short code to establish a communication session with a public safety answering point (PSAP), the IMS node 212 may determine to omit one or more of the feature tags 216 from the SIP response 120 in an effort to help connect the user to a nearest PSAP, which may facilitate providing emergency services to the user's location quicker. In this scenario, the determination at 230 may also evaluate a profile of the calling party to determine if he/she is a roaming subscriber or a home subscriber. Consider a scenario where two carriers negotiate a roaming contract that stipulates roaming subscribers who make VoWiFi calls on a roaming network are to be routed to their home network. As such, a roaming UE 102 that makes an emergency call (e.g., 911 in the United States) over a WiFi RAT (i.e., VoWiFi) may be routed to a PSAP in their home network, which may be far away (geographically) from an actual location of the user. For instance, a roaming user from Japan may make a VoWiFi call to 911 while in the United States, and while roaming on a United States carrier's network, and, pursuant to a roaming contract, may be routed to a PSAP in Japan instead of a PSAP in the United States. In this scenario, the IMS node 212 in FIG. 2 may determine, at 230, that the incoming session request is an emergency VoLTE call, and based on the user of the UE 102 being a roaming subscriber, the IMS node 212 may omit the "VoWiFiFB" feature tag 216(2) from the SIP response 120 to ensure that the UE 102 does not fallback to a WiFi RAT 108 to try and establish an emergency call, so as to avoid routing the user to a geographically disparate PSAP.

Another example criterion that can be evaluated to make the determination at 230 is whether any of the feature tags 216 in the SIP request 114 correspond to a type of RAT 108 that is the same as the RAT 108 specified in the private header 228 of the SIP request 114. In the example of FIG. 2, the RAT 108 specified as "EUTRAN" in the private header 228 of the SIP request 114 is a 4G LTE RAT, and the first feature tag 216(1) also corresponds to a 4G LTE RAT. As such, the determination at 230 may be to omit the first feature tag 216(1) from the SIP response 120 based on the notion that if the UE 102 fails to establish a communication session on a 4G LTE RAT, it may be a waste of time and resources to reattempt to establish the communication session on the 4G LTE RAT. This scenario may occur when a preferred RAT 108(1) (e.g., a 5G RAT) is unavailable to the UE 102, such that when the UE 102 specifies that it has a capability to fallback to a 4G LTE RAT, the IMS node 212 may determine to not authorize a fallback to the same 4G LTE RAT in the event that a communication session cannot be established on the 4G LTE RAT.

Yet another example criterion that can be evaluated to make the determination at 230 is whether a current network capacity metric indicates that a capacity of the telecommunications network 204 is insufficient to handle network traffic from UEs using individual ones of the UE-supported Fallback RATs 118. For instance, the IMS node 212 may be configured to measure a current network capacity metric based on data available to the IMS node 212 in regards to numbers of UEs using the telecommunications network 204 (perhaps broken down by geographical region, etc.), and may evaluate whether the capacity metric is at a level (e.g., above a threshold) to indicate that the network will be unduly stressed in the event of a widespread outage were UEs allowed to fallback to a particular Fallback RAT. Consider a case where the feature tag 216(1) corresponds to such a Fallback RAT 118. In this case, the IMS node 212 may omit the feature tag 216(1) from the SIP response 120 based on the current network capacity metric in order to provide time for the network to recover in the event of a widespread outage on a different (e.g., preferred) RAT 108(1).

Yet another example criterion that can be evaluated to make the determination at 230 is whether any of the Fallback RATs corresponding to the feature tags 216(1)-(3) in the SIP request 114 represent circuit-switched RATs that employ circuit-switching for voice communications, and, if so, whether the UE 102 has performed a combined attach procedure to register on both the circuit-switched network and a packet-switched network (e.g., 4G LTE). For instance, the "CSFB" feature tag 216(3) may correspond to a circuit-switched Fallback RAT, and the IMS node 212 may determine this at 230, and may determine that the UE 102 has not performed a combined attach procedure and is, therefore, not registered on a circuit-switched network. In this scenario, the IMS node 212 may determine to omit the CSFB feature tag 216(3) from the SIP response 120 so as to avoid having the UE 102 reattempt to establish a communication session on a circuit-switched Fallback RAT when one may not be available to the UE 102.

In any event, the IMS node 212 determines which of the feature tags 216(1)-(3) to include in (if any), and/or which of the feature tags 216(1)-(3) to omit from (if any), the SIP response 120, and may send the SIP response 120 over the telecommunications network 204. Here, the inclusion of the feature tags 216(2) and 216(3) in the SIP response 120 indicates that the UE is authorized to reattempt communication sessions using a RAT 108(2) corresponding to the feature tag 216(2) and is authorized to reattempt communication sessions using a RAT 108(3) corresponding to the feature tag 216(3). Meanwhile, the omission of the feature tag 216(1) from the SIP response 120 indicates that the UE is not authorized to reattempt communication sessions using a RAT 108(1) corresponding to the feature tag 216(1). Thus, the UE 102 will refrain from trying to reattempt establishment of a failed communication session using the RAT 108(1) corresponding to the omitted feature tag 216(1).

The UE 102 may receive the SIP response 120 over the telecommunications network 204. The UE 102 may then perform setup procedures 234 to setup the communication session. If a preferred RAT (e.g., a 5G RAT) is available, the preferred RAT may be used in the attempt to establish the communication session. If such a preferred RAT is not available, a next best RAT may be used to attempt establishment of the communication session. These setup procedures 234 may represent any type of setup procedures, in any suitable number, that may be performed to setup and establish the communication session. Some examples of the setup procedures 234 include, without limitation, sending/receiving a session request (e.g., a SIP INVITE message), sending/receiving a session progress message (sometimes called a "183 response"), establishing a radio resource control (RRC) connection with a particular RAT 108, establishing a dedicated bearer (e.g., a dedicated evolved packet system (EPS) bearer), sending/receiving a 100 Trying message (indicating a session request has been received at a terminating device), sending/receiving a 180. Ringing message (indicating that a terminating party of the terminating device is being alerted), sending/receiving an UPDATE message, sending/receiving various "ACK" messages (e.g., a PRACK message), and so on. A person having ordinary skill in the art will readily recognize that the setup procedures 234 are not limited to the examples described herein, and that other (e.g., different and/or additional) setup procedures may be performed in order to setup the communication session over a telecommunication network 204. Furthermore, some of the example setup procedures described herein may be omitted or unnecessary for setting up a communication session.

At some point during the communication session setup, an issue may arise that inhibits the communication session from being established using the best available RAT. This can be determined by the UE 102 in various ways in order to trigger the initiation of a fallback procedure to reattempt to establish the communication session. In some embodiments, the UE 102 may not receive an expected response (e.g., a final 2xx-6xx response) from the network after a threshold period of time (e.g., a timeout, such as a call setup timer timeout), and may deduce that the communication session cannot be established using the RAT the UE 102 was attempting to use. In other embodiments, the UE 102 may receive a failure message 240 from the network (e.g., from the IMS node 212). This failure message 240 may be sent as an additional SIP response using SIP protocol, or a response using Non-access Stratum (NAS) signaling, etc. In some embodiments, the failure message 240 includes a code that is to be interpreted by the UE 102 as an instruction to implement a fallback procedure. As such, omission of this code (or the inclusion of a different code in lieu of this code) may be interpreted by the UE 102 as an instruction to refrain from implementing a fallback procedure altogether. In this manner, the network may have the ability to dynamically determine whether a UE 102 is to implement a fallback procedure or not, and if the code is included in the failure message 240, instructing the UE 102 to implement a fallback procedure, the UE 102 reattempts to establish the communication session using an authorized Fallback RAT 118 according to the information in the SIP response 120.

It is to be appreciated that, in the scenario where fallback indicators 116 are exchanged during registration, the session failure can occur even before a session request is sent by the UE 102, such as before a SIP INVITE. For instance, a session setup may fail at the RRC re-establishment phase between the UE 102 and a RAN component (e.g., eNB), or the session setup may fail during an attempt to re-establish NAS signaling at the IMS Packet Data Network (PDN) layer between the UE 102 and a mobility management entity (MME).

Regardless of whether or not the failure message 240 with a code is utilized, the UE 102 may be configured to reattempt to establish the communication session using an authorized Fallback RAT at 242. In the example of FIG. 2, the UE 102 may select one of the Fallback RATs corresponding to the feature tags 216(2) or 216(3) in the SIP response 120. As mentioned, a selection algorithm (e.g., selecting a next best RAT) can be utilized when multiple Fallback RATs are authorized in the SIP response 120.

Assuming a successful reattempt, a final success response 236 (e.g., SIP 200 (OK)) may be received by the UE 102 in order to establish the communication session at 238, in this case using the authorized Fallback RAT selected by the UE 102. It is to be appreciated that, in the event that there is an issue with setting up the communication session using the Fallback RAT, other types of final responses may be transmitted to resolve the session setup on the reattempt, such as a 4xx—client failure, a 5xx—server failure, or a 6xx—global failure. The communication session setup is not complete unless and until the UE 102 receives a final response (e.g., a success response 236, a 4xx response, a 5xx response, a 6xx response, etc.). Furthermore, the communication session is not established at 238 unless and until the UE 102 receives a final response in the form of a success response 236 (e.g., SIP 200 (OK)).

It is to be appreciated that the arrangement of the signaling in FIG. 2 is not necessarily meant to depict a particular order of the signaling that is to take place. With this in mind, any given signal shown in FIG. 2 may occur before, during, or after any of the other specific signaling that is shown in FIG. 2.

It is also to be appreciated that, although a reattempt scenario is depicted in FIG. 2, and elsewhere in this disclosure, the techniques and systems described herein may additionally, or alternatively, be utilized to resume an ongoing communication session that has failed after an initial establishment. For example, the UE 102 may be configured to resume a failed communication session (e.g., using an automatic redial) with an authorized RAT. Thus, session continuity can be preserved through the exchange of fallback indicators in SIP signaling.

The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

Figure 3:
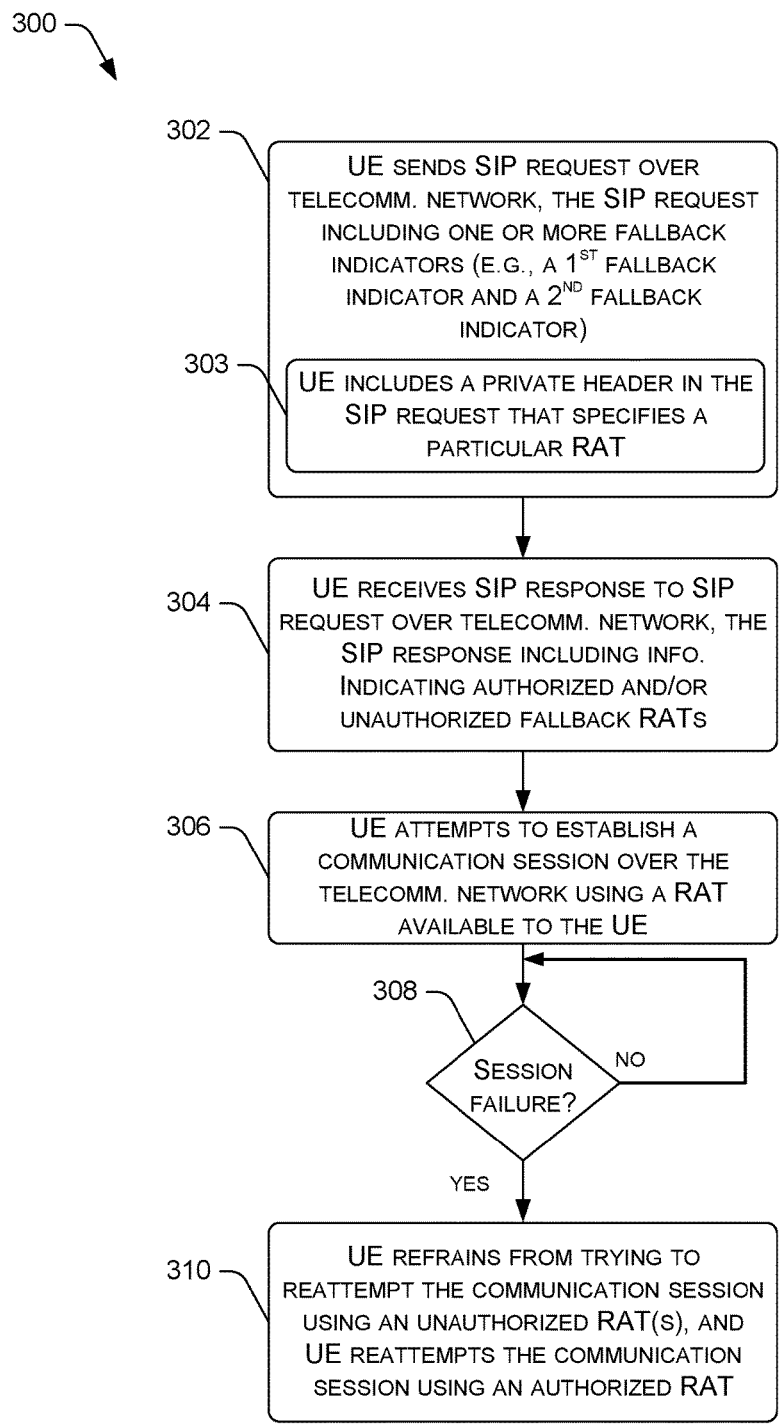
FIG. 3 illustrates a flowchart of an example process implemented by a UE to exchange fallback indicators with an IMS node in SIP signaling.

FIG. 3 illustrates a flowchart of an example process 300 implemented by a UE 102 to exchange fallback indicators with an IMS node 212 in SIP signaling. The process 300 is described, by way of example, with reference to the previous figures.

At 302, a UE 102 may send, over a telecommunications network 204, a SIP request 114, the SIP request 114 including one or more fallback indicators 116'. In an example, the SIP request 114 may include a first fallback indicator 116'(1) and a second fallback indicator 116'(2) that is different from the first fallback indicator 116'(1), and perhaps one or more additional fallback indicators 116'. These fallback indicators 116' may indicate the UE's 102 capabilities in terms of the RATs 108 supported by the UE 102 for implementing fallback procedures in the event of a communication session failure. In some implementations, the fallback indicators 116' may be in the form of feature tags 216, the feature tags included in a header 226 of the SIP request 114. Moreover, the SIP request 114 sent at block 302 may represent a registration request or a session request.

At sub-block 303, in some embodiments the UE 102 may optionally include a private header 228 (e.g., a PANI header) that specifies a particular RAT 108 that is available to the UE 102 to establish a communication session. If the SIP request 114 transmitted at block 302 represents a session request (e.g., using the SIP INVITE method), the UE 102 may be presently attempting to establish a communication session using the particular RAT 108. The RAT 108 specified in the private header 228 may be utilized by a receiving IMS node 212 to determine which UE-supported Fallback RATs to authorize or not authorize, as described herein.

At 304, the UE 102 may receive, over the telecommunications network 204, a SIP response 120 to the SIP request 114. The SIP response 120 may include information indicating whether the UE is authorized or not authorized to reattempt communication sessions using particular Fallback RATs 118 corresponding to individual ones of the fallback indicators 116' included in the SIP request 114. For example, if the SIP request 114 sent at block 302 includes a first fallback indicator 116'(1) and a second fallback indicator 116'(2), the SIP response 120 may include information indicating that the UE 102 is (i) not authorized to reattempt communication sessions using a first RAT 108(1) corresponding to the first fallback indicator 116'(1), and (ii) authorized to reattempt communication sessions using a second RAT 108(2) corresponding to the second fallback indicator 116'(2). This information may indicate as much by including a set of fallback indicators 116" in the SIP response 120 that omits the first fallback indicator 116'(1) and includes the second fallback indicator 116'(2), which were both included in the SIP request 114, or the SIP response 120 may provide answers (e.g., "yes" or "no", "authorized" or "not authorized") next to all of the UE-supported fallback indicators 116".

At 306, the UE 102 may attempt to establish a communication session over the telecommunications network 204 using a RAT 108 that is available to the UE 102 at a time of the attempting at block 306. This may be the best available RAT 108 for that UE at the UE's 102 current geographic location. In some embodiments, this represents a preferred RAT 108(1) (e.g., a 5G RAT). In some embodiments, the RAT 108 used in the attempt to establish the communication session at block 306 may be the same RAT as the RAT 108 that is specified in the private header 228 of the SIP request 114.

At 308, the UE 102 may determine whether there has been a session failure in the sense that the communication session cannot be established using the existing RAT 108 (i.e., the RAT 108 that was used to attempt establishment of the communication session at block 306). As mentioned, the UE 102 can make this determination in various ways (e.g., a timeout without receiving an expected response from the network, receiving a particular error message from the network, etc.).

If, at block 308, the UE 102 determines that there has been no session failure, the process 300 may continue to monitor the session status by following the "no" route from block 308 to iterate the determination at block 308. If and when an issue arises that inhibits the communication session from being established using the existing RAT 108 (and the UE 102 detects this session failure at block 308), the process 300 may follow the "yes" route from block 308 to block 310. In some embodiments, the UE 102, at block 308, may determine that the communication session cannot be established using the existing RAT 108 based on receiving an additional SIP response over the telecommunications network 204, such as a failure message 240 that includes a code (e.g., a predefined code) that is interpreted by the UE 102 as an instruction to reattempt the failed communication session using an authorized Fallback RAT 118.

At 310, the UE 102 may reattempt to establish the communication session using an authorized RAT indicated in the SIP response 120 the UE 102 received at block 304. In the running example, if the information in the SIP response 120 indicates (e.g., by inclusion of the second fallback indicator 116'(2)) that a second UE-supported RAT 108(2) is authorized for use in reattempting establishiment of communication sessions, the UE 102 may reattempt to establish the communication session using this authorized RAT 108(2). In addition, the UE 102 may also refrain from trying to reattempt establishment of the communication session using an unauthorized RAT(s) indicated in the SIP response 120 the UE 102 received at block 304. In the running example, if the information in the SIP response 120 indicates (e.g., by omission of the first fallback indicator 116'(1)) that a first UE-supported RAT 108(1) is not authorized for use in reattempting communication sessions, the UE 102 may, at block 310, refrain from trying to reattempt establishment of the communication session using this unauthorized RAT 108(1).

Consider an example where the SIP response 120 indicates that a RAT 108(2)—corresponding to a RAT usable by the UE 102 to reattempt communication sessions as VoLTE calls—is authorized. In this scenario, the UE 102, at block 310, may reattempt to establish the communication session by falling back to a VoLTE call after failing to establish a voice call over 5G. The SIP response 120 may also indicate that a RAT 108(1)—corresponding to a RAT usable (i.e., supported) by the UE 102 to reattempt communication sessions as VoWiFi calls—is not authorized. In this scenario, the UE 102, at block 310, may refrain from trying to fallback to a VoWiFi call. Accordingly, the network's determination to preclude the UE 102 from attempting to fallback to a VoWiFi call may conserve resources because the network can determine that it may be futile for the UE 102 to attempt a fallback to a VoWiFi call.

Figure 4:
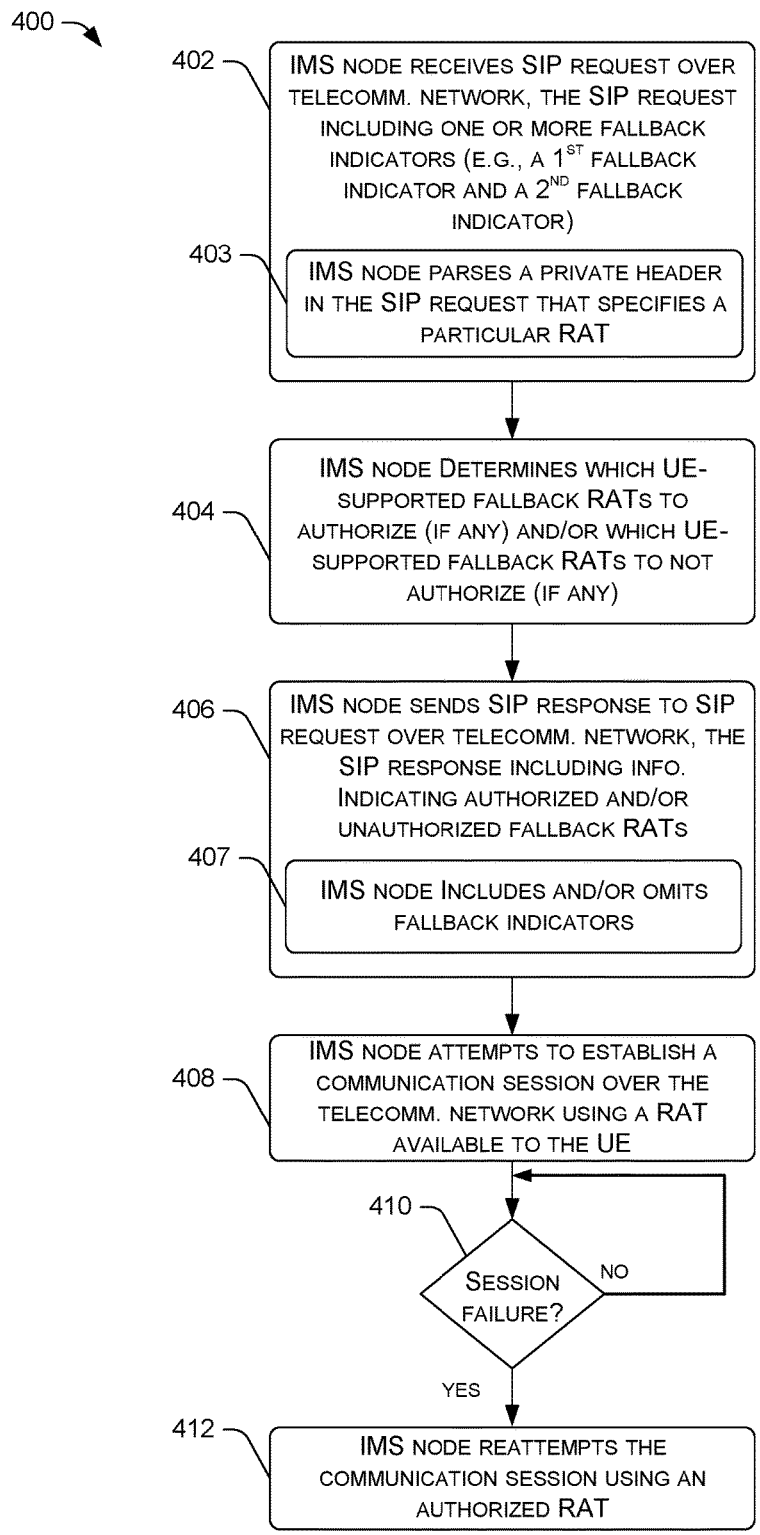
FIG. 4 illustrates a flowchart of an example process implemented by an IMS node to exchange fallback indicators with a UE in SIP signaling.

FIG. 4 illustrates a flowchart of an example process 400 implemented by an IMS node 212 to exchange fallback indicators with a UE 102 in SIP signaling. The process 400 is described, by way of example, with reference to the previous figures.

At 402, an IMS node 212 may receive, over a telecommunications network 204, a SIP request 114 from a UE 102. The SIP request 114 may include one or more fallback indicators 116' indicating the capabilities of the UE 102 in terms of the Fallback RATs 118 the UE 102 supports. For example, the fallback indicators 116' included in the SIP request 114 may include a first fallback indicator 116'(1) and a second fallback indicator 116'(2) that is different from the first fallback indicator 116'(1). The fallback indicators 116' may comprise feature tags 216, and may be included in a header 226 of the SIP request 114. The SIP request 114 may further include a private header 228 that specifies a particular RAT 108. This RAT 108 may represent a RAT that the UE 102 is using while trying to establish a communication session (e.g., when the SIP request 114 is a session request).

As shown in sub-block 403, in some embodiments the IMS node 212 may read or parse the optional private header 228 to identify the RAT 108 specified in the private header 228.

At 404, the IMS node 212 may determine which of the UE-supported Fallback RATs 118 (as indicated by the fallback indicators 116' in the SIP request 114) to authorize (if any), and which of the UE-supported Fallback RATs 118 not to authorize (if any). Various criteria may be evaluated at block 404 to make this determination.

At 406, the IMS node 212 may send, over the telecommunications network 204, a SIP response 120 to the SIP request 114, the SIP response including information indicating which of the UE-supported Fallback RATs 118 (as indicated by the fallback indicators 116' in the SIP request 114) the UE is authorized and/or not authorized to utilize in reattempting to establish a communication session.

As indicated by sub-block 407, in some embodiments the IMS node 212 may include optional fallback indicators 116" in the SIP response 120 to indicate which of the UE-supported Fallback RATs 118 are authorized for reattempting communication sessions. Additionally, or alternatively, the IMS node 212 may omit fallback indicators from the SIP response 120 to indicate which of the UE-supported Fallback RATs 118 are not authorized for reattempting communication sessions. As described herein, these fallback indicators 116" may be in the form of feature tags 216, and the feature tags 216 may be included in a header 232 of the SIP response 120. In some embodiments, the information in the SIP response 120 may include answers (e.g., "yes" or "no"; "authorized" or "not authorized", etc.) for each of the fallback indicators 116' that were included in the SIP request 114.

At 408, the IMS node 212 may attempt to establish a communication session for the UE 102 over the telecommunications network 204 using a particular RAT 108 that is available to the UE 102 at a time of the attempting at block 408.

At 410, the IMS node 212 may monitor for a session failure, and so long as no session failure occurs, the process 400 may follow the "no" route from block 410 to continue monitoring the session status (i.e., iterating block 410). If and when a session failure occurs (e.g., an issue arises inhibiting the communication session from being established using the existing RAT 108), the process 400 may follow the "yes" route from block 410 to block 412.

At 412, the IMS node 212 may reattempt to establish the communication session for the UE 102 using a RAT authorized in the SIP response 120 sent at block 406.

Figure 5:
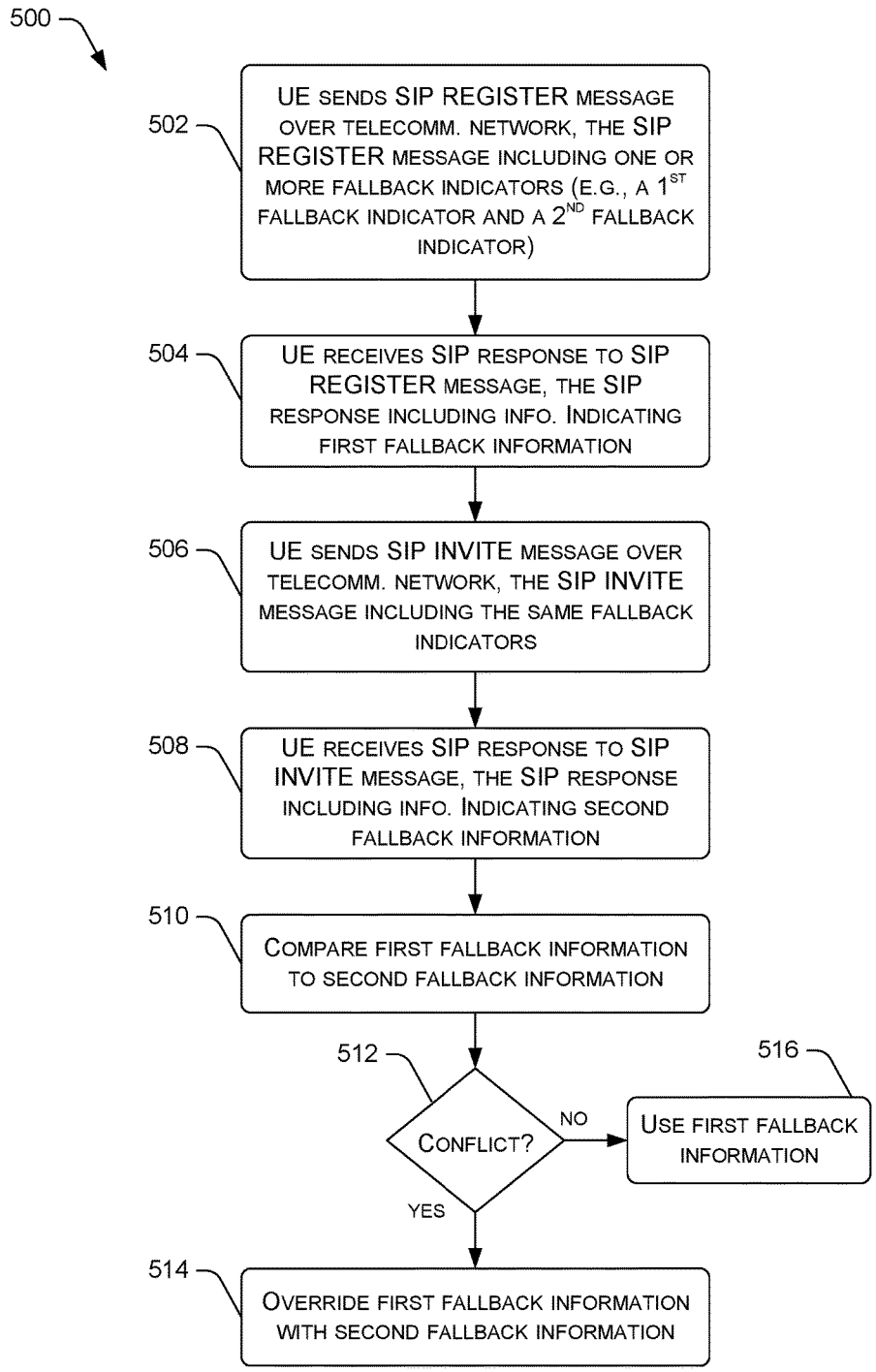
FIG. 5 illustrates a flowchart of an example process implemented by a UE to resolve conflicting fallback information received from an IMS node.

FIG. 5 illustrates a flowchart of an example process 500 implemented by a UE 102 to resolve conflicting fallback information received from an IMS node 212. The process 500 is described, by way of example, with reference to the previous figures.

At 502, a UE 102 may send, over a telecommunications network 204, a SIP request 114 as a registration request using the SIP REGISTER method. The SIP request 114 sent as a registration request may include one or more fallback indicators 116'. In an example, the SIP request 114 sent as a registration request may include a first fallback indicator 116'(1) and a second fallback indicator 116'(2) that is different from the first fallback indicator 116'(1), and perhaps one or more additional fallback indicators 116'. These fallback indicators 116' may indicate the UE's 102 capabilities in terms of the RATs 108 supported by the UE 102 for implementing fallback procedures in the event of a communication session failure. In some implementations, the fallback indicators 116' may be in the form of feature tags 216, the feature tags included in a header 226 of the SIP request 114.

At 504, the UE 102 may receive, over the telecommunications network 204, a SIP response 120 to the SIP request 114 that was sent as a registration request, the SIP response 120 including first fallback information indicating whether the UE is authorized or not authorized to reattempt communication sessions using particular Fallback RATs 118 corresponding to individual ones of the fallback indicators 116' included in the SIP request 114 that was sent as a registration request. For example, if the SIP request 114 sent as a registration request at block 502 includes a first fallback indicator 116'(1) and a second fallback indicator 116'(2), the SIP response 120 may include information indicating that the UE 102 is (i) not authorized to reattempt communication sessions using a first RAT 108(1) corresponding to the first fallback indicator 116'(1), and (ii) authorized to reattempt communication sessions using a second RAT 108(2) corresponding to the second fallback indicator 116'(2). This information may indicate as much by including a set of fallback indicators 116" in the SIP response 120 that omits the first fallback indicator 116'(1) and includes the second fallback indicator 116'(2), which were both included in the SIP request 114 that was sent as a registration request, or the SIP response 120 may provide answers (e.g., "yes" or "no", "authorized" or "not authorized") next to all of the UE-supported fallback indicators 116'.

At 506, the UE 102 may send, over a telecommunications network 204, a SIP request 114 as a session request using the SIP INVITE method. The SIP request 114 sent as a session request may include the same fallback indicators 116' that were included in the SIP request 114 sent as a registration request at block 502.

At 508, the UE 102 may receive, over the telecommunications network 204, a SIP response 120 to the SIP request 114 that was sent as a session request, the SIP response 120 including second fallback information indicating whether the UE is authorized or not authorized to reattempt communication sessions using particular Fallback RATs 118 corresponding to individual ones of the fallback indicators 116' included in the SIP request 114 that was sent as a session request.

At 510, the UE 102 may compare the first fallback information received at block 504 to the second fallback information received at block 508. For example, if the respective SIP responses received at those blocks include fallback information in the form of a set of one or more fallback indicators 116", the UE 102 may compare the respective sets of fallback indicators 116" received during the registration stage and session stage. As another example, if the respective SIP responses received at blocks 504 and 508 include fallback information in the form of "yes/no" indicators associated with the fallback indicators 116' sent in the respective SIP requests, the UE 102 may compare the respective sets of "yes/no" indicators received during the registration stage and the session stage.

At 512, and based on the comparison of the fallback information at block 510, the UE 102 may determine if the compared fallback information conflicts (e.g., if one set of fallback indicators includes a fallback indicator that is omitted from the other set, or vice versa).

If, at block 512, a conflict is detected, the process 500 may follow the "yes" route from block 512 to block 514 where the UE 102 may override the first fallback information with the second fallback information. That is, the fallback information received in response to the session request may be used for fallback purposes in lieu of previously-received fallback information received in response to the registration request. It is to be appreciated that the UE 102, at block 514, may override the second fallback information with the first fallback information. That is, the fallback information received in response to the registration request may be used for fallback purposes in lieu of subsequently-received fallback information received in response to the session request. The overriding operation at block 514 may result in the UE 102 changing its behavior in the event that a communication failure is experienced using an existing RAT. For example, the overriding at block 514 may result in the UE 102 falling back to a different Fallback RAT 118 as compared to the Fallback RAT 118 that would have been utilized had the first fallback information been relied upon.

If, at block 512, a conflict is not detected based on the comparison at block 510 (e.g., both SIP responses included the same set of fallback indicators 116", or both SIP responses included the same answers for all of the UE-supported fallback indicators, etc.), the process 500 may follow the "no" route from block 512 to block 516, where the UE 102 may use the first fallback information received at block 504 (e.g., by discarding the second fallback information received at block 508 upon detecting that it is the same as the first fallback information) In an example where the same set of fallback indicators 116" are included in both SIP responses, the UE 102 may use the first set of fallback indicators 116" received at block 504 (e.g., by discarding the second set of fallback indicators 116" received at block 508).

Figure 6:
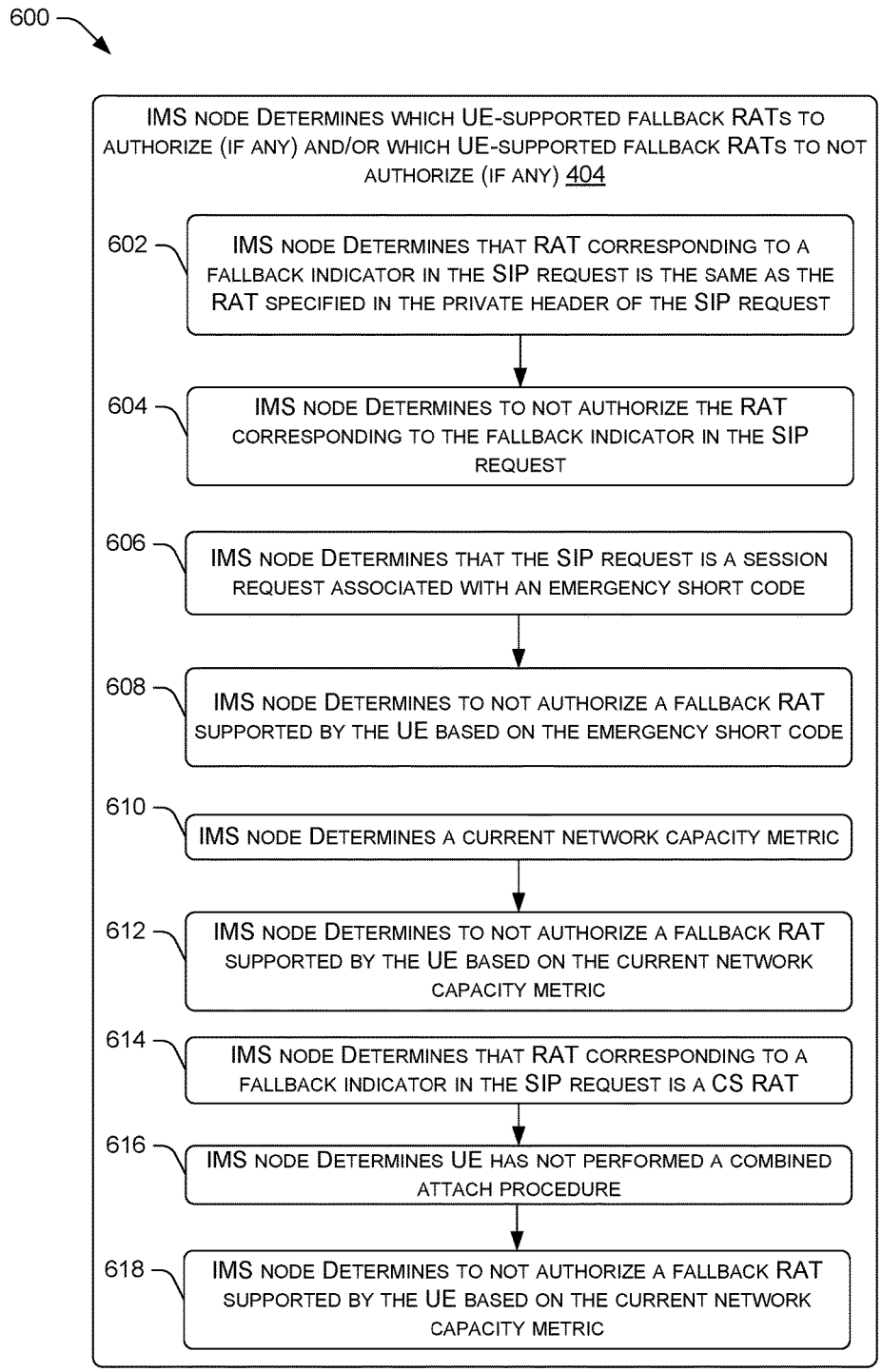
FIG. 6 illustrates a flowchart of an example process implemented by an IMS node to determine which UE-supported Fallback RATs to authorize and/or not authorize.

FIG. 6 illustrates a flowchart of an example process 600 implemented by an IMS node 212 to determine which UE-supported Fallback RATs to authorize and/or not authorize. The process 600 is described by way of example with reference to the previous figures. Furthermore, as indicated in FIG. 6, the process 600 may represent sub-operations that are performed at block 404 of the process 400 of FIG. 4, which assumes that the IMS node 212 is already in receipt of a SIP request 114 from a UE 102, the SIP request 114 including one or more fallback indicators 116'.

At 602, the IMS node 212 may determine that a Fallback RAT 118 corresponding to a fallback indicator 116' in the received SIP request 114 is the same as the RAT 108 specified in a private header 228 of the SIP request 114. This indicates that the UE 204 is informing the IMS node 212 that it is capable of falling back to the same RAT it is using to establish the communication session.

At 604, in response to determining that the Fallback RAT 118 corresponding to the fallback indicator 116' in the SIP request 114 matches the RAT 108 in the private header 228, the IMS node 212 may determine to not authorize the Fallback RAT 118 corresponding to the fallback indicator 116'. To do this, the IMS node 212 may, at block 604, determine to omit the fallback indicator 116' from the set of fallback indicators 116" in the SIP response 120.

At 606, the IMS node 212 may determine that the received SIP request 114 is a session request (e.g., using the SIP INVITE method) that is associated with an emergency short code (e.g., 911 in the United States) to establish the communication session with a PSAP.

At 608, the IMS node 212 may determine to not authorize a Fallback RAT 118 corresponding to one of the fallback indicators 116' included in the SIP request 114 because the session request being associated with the emergency short code. To do this, the IMS node 212 may, at block 608, determine to omit a fallback indicator 116' from the set of fallback indicators 116" in the SIP response 120 based at least in part on the session request being associated with the emergency short code.

At 610, the IMS node 212 may determine a current network capacity metric that indicates a capacity of the telecommunications network 204 to handle network traffic from UEs using a one of the Fallback RATs 118 corresponding to a fallback indicator 116' included in the SIP request 114.

At 612, the IMS node 212 may determine to not authorize a Fallback RAT 118 corresponding to one of the fallback indicators 116' included in the SIP request 114 based at least in part on the current network capacity metric (e.g., based on the current network capacity metric meeting or exceeding a threshold value). To do this, the IMS node 212 may, at block 612, determine to omit a fallback indicator 116' from the set of fallback indicators 116" in the SIP response 120 based at least in part on the current network capacity metric.

At 614, the IMS node 212 may determine that a Fallback RAT 118 corresponding to a fallback indicator 116' in the received SIP request 114 represents a RAT 108 usable by the UE 102 to reattempt communication sessions on a circuit-switched network (i.e., a CS Fallback RAT 118).

At 616, the IMS node 212 may determine that the UE 102 has not performed a combined attach procedure and is, therefore, not registered on a circuit-switched network.

At 618, the IMS node 212 may determine to not authorize the CS Fallback RAT 118 based at least in part on the UE 102 not having performed a combined attach procedure to register on both a circuit-switched network and a packet-switched network. To do this, the IMS node 212 may, at block 618, determine to omit the fallback indicator 116' corresponding to the CS Fallback RAT 118 from the set of fallback indicators 116" in the SIP response 120 based at least in part on the UE 102 not having performed a combined attach procedure to register on both a circuit-switched network and a packet-switched network.

Figure 7:
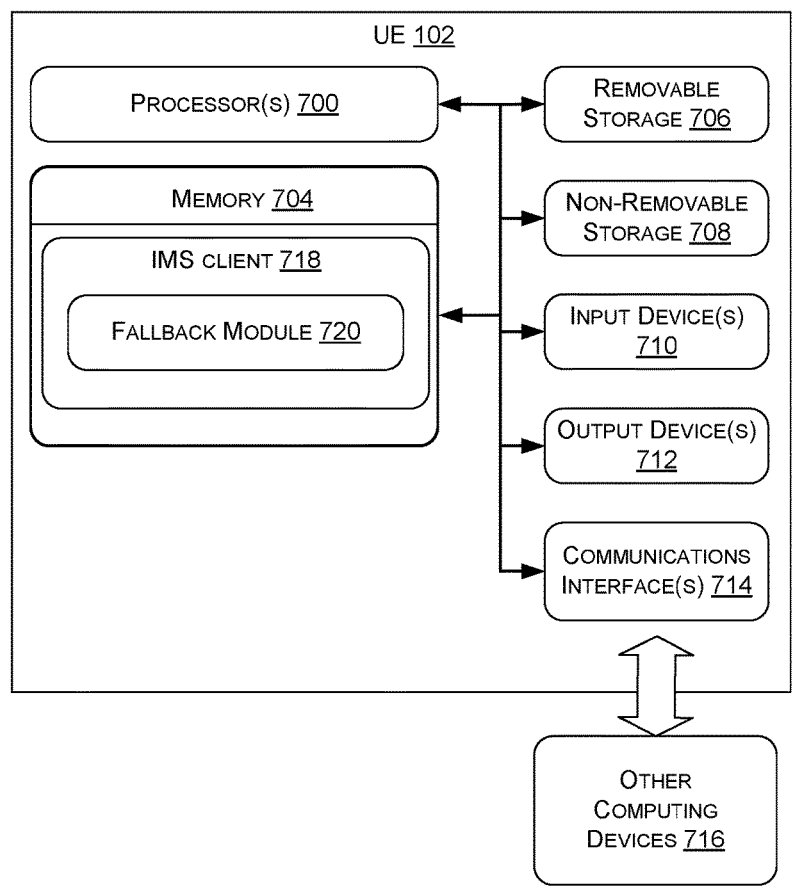
FIG. 7 is a block diagram of an example UE configured to exchange fallback indicators in SIP signaling.

FIG. 7 is a block diagram of an example UE 102 configured to exchange fallback indicators in SIP signaling.

As shown, the UE 102 may include one or more processors 700 and one or more forms of computer-readable memory 704. The UE 102 may also include additional storage devices. Such additional storage may include removable storage 706 and/or non-removable storage 708.

The UE 102 may further include input device(s) 710 and output device(s) 712 (e.g., a display(s), speaker(s), etc.) communicatively coupled to the processor(s) 700 and the computer-readable memory 704. The UE 102 may further include communications interface(s) 714 that allow the UE 102 to communicate with other computing devices 716 (e.g., IMS nodes, other UEs) such as via a network. The communications interface(s) 714 may facilitate transmitting and receiving wired and/or wireless signals over any suitable communications/data technology, standard, or protocol, as described herein. For example, the communications interface(s) 714 can comprise one or more of a cellular radio, a wireless (e.g., IEEE 802.1x-based) interface, a Bluetooth® interface, and so on. The communications interface(s) 714 may further enable the UE 102 to communicate over circuit-switched domains and/or packet-switched domains.

In various embodiments, the computer-readable memory 704 comprises non-transitory computer-readable memory 704 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 704 may also be described as computer storage media and may include volatile and nonvolatile, removable and non-removable media implemented in any method or technology for storage of information, such as computer readable instructions, data structures, program modules, or other data. Computer-readable memory 704, removable storage 706 and non-removable storage 708 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the UE 102. Any such computer-readable storage media may be part of the UE 102.

The memory 704 can include an IMS client 718 (including a fallback module 720). The IMS client 718 and fallback module 720 may represent computer-executable instructions (or logic) that, when executed, by the processor(s) 700, perform the various acts and/or processes disclosed herein.

Figure 8:
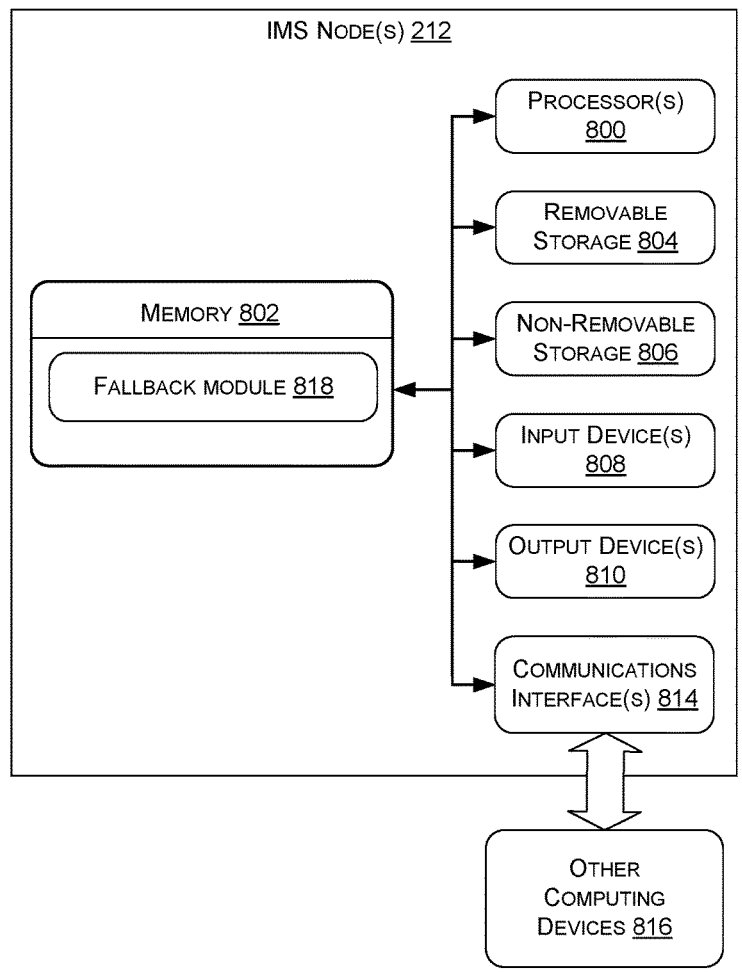
FIG. 8 is a block diagram of an example IMS node configured to exchange fallback indicators in SIP signaling.

FIG. 8 is a block diagram of an example IMS node(s) 212 configured to exchange fallback indicators in SIP signaling. The IMS node(s) 212 may be representative an IMS node of the IMS core 112 described herein.

As shown, the IMS node(s) 212 may include one or more processors 800 and one or more forms of computer-readable memory 802. The IMS node(s) 212 may also include additional storage devices. Such additional storage may include removable storage 804 and/or non-removable storage 806.

The IMS node(s) 212 may further include input devices 808 and output devices 810 communicatively coupled to the processor(s) 800 and the computer-readable memory 804. The IMS node(s) 212 may further include communications interface(s) 814 that allow the IMS node(s) 212 to communicate with other computing devices 816 (e.g., UEs) such as via a network. The communications interface(s) 814 may facilitate transmitting and receiving wired and/or wireless signals over any suitable communications/data technology, standard, or protocol, as described herein.

In various embodiments, the computer-readable memory 802 comprises non-transitory computer-readable memory 802 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 802 may also be described as computer storage media and may include volatile and nonvolatile, removable and non-removable media implemented in any method or technology for storage of information, such as computer readable instructions, data structures, program modules, or other data. Computer-readable memory 802, removable storage 804 and non-removable storage 806 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the IMS node(s) 212. Any such computer-readable storage media may be part of the IMS node(s) 212.

The memory 802 can include fallback module 818, which may represent computer-executable instructions (or logic) that, when executed, by the processor(s) 800, perform the various acts and/or processes disclosed herein.

The environment and individual elements described herein may of course include many other logical, programmatic, and physical components, of which those shown in the accompanying figures are merely examples that are related to the discussion herein.

The various techniques described herein are assumed in the given examples to be implemented in the general context of computer-executable instructions or software, such as program modules, that are stored in computer-readable storage and executed by the processor(s) of one or more computers or other devices such as those illustrated in the figures. Generally, program modules include routines, programs, objects, components, data structures, etc., and define operating logic for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

We claim:

1. A method comprising:
    sending, by a user equipment (UE) and over a telecommunications network, a Session Initiation Protocol (SIP) request, the SIP request including a first fallback indicator and a second fallback indicator that is different from the first fallback indicator;
    receiving, by the UE and over the telecommunications network, a SIP response to the SIP request, the SIP response including information indicating that the UE is (i) not authorized to reattempt communication sessions using a first fallback radio access technology corresponding to the first fallback indicator, and (ii) authorized to reattempt communication sessions using a second fallback radio access technology corresponding to the second fallback indicator;
    attempting, by the UE, to establish a communication session over the telecommunications network using a particular radio access technology that is available to the UE at a time of the attempting;
    determining, by the UE, that the communication session cannot be established using the particular radio access technology; and
    in response to the determining that the communication session cannot be established using the particular radio access technology, reattempting, by the UE and based at least in part on the information included in the SIP response, to establish the communication session using the second fallback radio access technology.

2. The method of claim 1, wherein the information included in the SIP response (i) omits the first fallback indicator to indicate that the UE is not authorized to reattempt communication sessions using the first fallback radio access technology, and (ii) includes the second fallback indicator to indicate that the UE is authorized to reattempt communication sessions using the second fallback radio access technology.

3. The method of claim 1, wherein:
    the first fallback indicator comprises a first feature tag;
    the second fallback indicator comprises a second feature tag; and
    the first feature tag and the second feature tag are included in a header of the SIP request to indicate that the first fallback radio access technology and the second fallback radio access technology are supported by the UE.

4. The method of claim 1, wherein the SIP request is a registration request that uses the SIP REGISTER method to request registration for one or more Internet Protocol Multimedia Subsystem (IMS)-based services.

5. The method of claim 1, wherein the SIP request is a session request that uses the SIP INVITE method to request establishment of the communication session.

6. The method of claim 5, further comprising:
    receiving, by the UE prior to the sending of the SIP request and over the telecommunications network, a previous SIP response to a registration request, the previous SIP response including the first fallback indicator; and in response to the receiving of the SIP response, to the SIP request, that omits the first fallback indicator, determining that the UE is not authorized to reattempt communication sessions using the first fallback radio access technology corresponding to the first fallback indicator.

7. The method of claim 1, wherein the SIP request further includes a private header that specifies the particular radio access technology.

8. A method comprising:
receiving, by an Internet Protocol Multimedia Subsystem (IMS) node and over a telecommunications network, a Session Initiation Protocol (SIP) request from a user equipment (UE), the SIP request including a first fallback indicator and a second fallback indicator that is different from the first fallback indicator;
sending, by the IMS node and over the telecommunications network, a SIP response to the SIP request, the SIP response including information indicating that the UE is (i) authorized to reattempt communication sessions using a first fallback radio access technology corresponding to the first fallback indicator, and (ii) not authorized to reattempt communication sessions using a second fallback radio access technology corresponding to the second fallback indicator;
attempting, by the IMS node, to establish a communication session for the UE over the telecommunications network using a particular radio access technology that is available to the UE at a time of the attempting; and
in response to an issue inhibiting the communication session from being established using the particular radio access technology, reattempting, by the IMS node and based at least in part on the information included in the SIP response, to establish the communication session for the UE using the first fallback radio access technology.

9. The method of claim 8, wherein the information included in the SIP response (i) includes the first fallback indicator to indicate that the UE is authorized to reattempt communication sessions using the first fallback radio access technology, and (ii) omits the second fallback indicator to indicate that the UE is not authorized to reattempt communication sessions using the second fallback radio access technology.

10. The method of claim 8, wherein:
the first fallback indicator comprises a first feature tag;
the second fallback indicator comprises a second feature tag; and
the first feature tag and the second feature tag are included in a header of the SIP request to indicate that the first fallback radio access technology and the second fallback radio access technology are supported by the UE.

11. The method of claim 8, wherein the SIP request is a session request, the method further comprising, prior to the sending of the SIP response:
determining that the session request is associated with an emergency short code to establish the communication session with a public safety answering point (PSAP); and
determining to omit the second fallback indicator from the SIP response based at least in part on the session request being associated with the emergency short code.

12. The method of claim 8, wherein the SIP request further includes a private header that specifies the particular radio access technology.

13. The method of claim 12, further comprising, prior to the sending of the SIP response:
determining that the particular radio access technology specified in the private header of the SIP request is a same radio access technology as the second fallback radio access technology corresponding to the second fallback indicator; and
determining to omit the second fallback indicator from the SIP response based at least in part on the particular radio access technology specified in the private header of the SIP request being the same radio access technology as the second fallback radio access technology corresponding to the second fallback indicator.

14. The method of claim 8, further comprising, prior to the sending of the SIP response:
determining a current network capacity metric that indicates a capacity of the telecommunications network to handle network traffic from UEs using the second fallback radio access technology corresponding to the second fallback indicator; and
determining to omit the second fallback indicator from the SIP response based at least in part on the current network capacity metric.

15. The method of claim 8, further comprising, prior to the sending of the SIP response:
determining that the second fallback radio access technology corresponding to the second fallback indicator represents a radio access technology usable by the UE to reattempt communication sessions on a circuit-switched network;
determining that the UE has not performed a combined attach procedure; and
determining to omit the second fallback indicator from the SIP response based at least in part on the determining that the UE has not performed the combined attach procedure.

16. The method of claim 8, further comprising, prior to the reattempting to establish of the communication session:
sending, by the IMS node and over the telecommunications network, an additional SIP response that includes a code instructing the UE to reattempt the communication session using another radio access technology.

17. A user equipment (UE) comprising:
a processor; and
memory storing computer-executable instructions that, when executed by the processor, cause the UE to:
send, over a telecommunications network, a Session Initiation Protocol (SIP) request, the SIP request including a first fallback indicator and a second fallback indicator that is different from the first fallback indicator;
receive, over the telecommunications network, a SIP response to the SIP request, the SIP response including information indicating that the UE is (i) not authorized to reattempt communication sessions using a first fallback radio access technology corresponding to the first fallback indicator, and (ii) authorized to reattempt communication sessions using a second fallback radio access technology corresponding to the second fallback indicator;
attempt to establish a communication session over the telecommunications network using a particular radio access technology that is available to the UE at a time of attempting to establish the communication session;

determine that the communication session cannot be established using the particular radio access technology; and in response to determining that the communication session cannot be established using the particular radio access technology, reattempt, based at least in part on the information included in the SIP response, to establish the communication session using the second fallback radio access technology.

18. The UE of claim 17, wherein the first fallback radio access technology is usable by the UE to reattempt the communication session as a voice over WiFi (VoWiFi) communication session, and wherein the second fallback radio access technology is usable by the UE to reattempt the communication session as a voice over long term evolution (VoLTE) communication session.

19. The UE of claim 17, wherein:
the first fallback indicator comprises a first feature tag;
the second fallback indicator comprises a second feature tag; and
the first feature tag and the second feature tag are included in a header of the SIP request to indicate that the first fallback radio access technology and the second fallback radio access technology are supported by the UE.

20. The UE of claim 17, wherein the SIP request is a session request that uses the SIP INVITE method to request establishment of the communication session.

21. An Internet Protocol Multimedia Subsystem (IMS) node comprising:
a processor; and
memory storing computer-executable instructions that, when executed by the processor, cause the IMS node to:
receive, over a telecommunications network, a Session Initiation Protocol (SIP) request from a user equipment (UE), the SIP request including a first fallback indicator and a second fallback indicator that is different from the first fallback indicator;
send, over the telecommunications network, a SIP response to the SIP request, the SIP response including information indicating that the UE is (i) authorized to reattempt communication sessions using a first fallback radio access technology corresponding to the first fallback indicator, and (ii) not authorized to reattempt communication sessions using a second fallback radio access technology corresponding to the second fallback indicator;
attempt to establish a communication session for the UE over the telecommunications network using a particular radio access technology that is available to the UE at a time of attempting to establish the communication session; and
in response to an issue inhibiting the communication session from being established using the particular radio access technology, reattempting, based at least in part on the information included in the SIP response, to establish the communication session for the UE using the first fallback radio access technology.

22. The IMS node of claim 21, wherein the information included in the SIP response (i) includes the first fallback indicator to indicate that the UE is authorized to reattempt communication sessions using the first fallback radio access technology, and (ii) omits the second fallback indicator to indicate that the UE is not authorized to reattempt communication sessions using the second fallback radio access technology.

23. The IMS node of claim 21, wherein the SIP request further includes a private header that specifies the particular radio access technology.

24. The IMS node of claim 23, wherein the computer-executable instructions, when executed by the processor, further cause the IMS node to, prior to sending the SIP response:
determine that the particular radio access technology specified in the private header of the SIP request is a same radio access technology as the second fallback radio access technology corresponding to the second fallback indicator; and
determine to omit the second fallback indicator from the SIP response based at least in part on the particular radio access technology specified in the private header of the SIP request being the same radio access technology as the second fallback radio access technology corresponding to the second fallback indicator.

25. The IMS node of claim 21, wherein the computer-executable instructions, when executed by the processor, further cause the IMS node to, prior to sending the SIP response:
determine a current network capacity metric that indicates a capacity of the telecommunications network to handle network traffic from UEs using the second fallback radio access technology corresponding to the second fallback indicator; and
determine to omit the second fallback indicator from the SIP response based at least in part on the current network capacity metric.

26. The IMS node of claim 21, wherein the computer-executable instructions, when executed by the processor, further cause the IMS node to, prior to sending the SIP response:
determine that the second fallback radio access technology corresponding to the second fallback indicator represents a radio access technology usable by the UE to reattempt communication sessions on a circuit-switched network;
determine that the UE has not performed a combined attach procedure; and
determine to omit the second fallback indicator from the SIP response based at least in part on the determining that the UE has not performed the combined attach procedure.

* * * * *